(12) United States Patent
Chacon

(10) Patent No.: US 9,657,719 B2
(45) Date of Patent: May 23, 2017

(54) VENTILATION ARRANGEMENT

(71) Applicant: General Electric Company, Schenectady, NY (US)

(72) Inventor: Joseph Lawrence Chacon, Greenville, SC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 425 days.

(21) Appl. No.: 14/305,112

(22) Filed: Jun. 16, 2014

(65) Prior Publication Data
US 2015/0361961 A1 Dec. 17, 2015

(51) Int. Cl.
*F03D 1/06* (2006.01)
*F03D 11/00* (2006.01)
*F03D 80/00* (2016.01)

(52) U.S. Cl.
CPC ............ *F03D 11/00* (2013.01); *F03D 1/0691* (2013.01); *F03D 80/00* (2016.05); *F05B 2260/64* (2013.01); *Y02E 10/721* (2013.01)

(58) Field of Classification Search
CPC .... F03D 1/0691; F03D 80/60; F05B 2260/20; F02E 10/721
See application file for complete search history.

(56) References Cited

U.S. PATENT DOCUMENTS

| | | |
|---|---|---|
| 1,699,949 A | 1/1929 | Bucklen |
| 4,527,072 A | 7/1985 | Van Degeer |
| 5,833,435 A * | 11/1998 | Smith ........................ F02C 7/04 156/153 |
| 6,278,197 B1 | 8/2001 | Appa |
| 6,285,090 B1 | 9/2001 | Brutsaert et al. |
| 6,676,122 B1 | 1/2004 | Wobben |
| 6,988,574 B2 | 1/2006 | Jones |
| 7,435,057 B2 | 10/2008 | Parera |
| 7,513,736 B2 | 4/2009 | Jannasch et al. |
| 7,621,720 B2 | 11/2009 | Nies |
| 8,029,239 B2 | 10/2011 | Luetze |
| 8,128,368 B2 | 3/2012 | Bielefedt |

(Continued)

FOREIGN PATENT DOCUMENTS

| | | | |
|---|---|---|---|
| GB | WO 2014020639 A1 * | 2/2014 | ............. F03D 11/00 |
| WO | 2009033925 A2 | 3/2009 | |

*Primary Examiner* — Kenneth Bomberg
*Assistant Examiner* — Sabbir Hasan
(74) *Attorney, Agent, or Firm* — GE Global Patent Operation; James Warren Pemrick

(57) ABSTRACT

A ventilation arrangement for a wind turbine includes a manhole cover for covering a manhole of a rotor hub. The rotor hub is contained within the nose cone and spaced therefrom to form an internal space between an inner surface of the nose cone and an outer surface of the rotor hub. The manhole cover provides a vent opening for venting hot air from an interior space of the rotor hub into the internal space. A pipe extends from a forward internal space through the manhole cover and into the rotor hub. The pipe establishes fluid communication between the forward internal space and the interior space. A fan is mounted to the pipe, and draws air from the forward internal space. An exhaust, fluidly connected with the pipe, is located in the rotor hub and away from the manhole cover by 50% to 90% of a rotor hub axial length.

10 Claims, 7 Drawing Sheets

(56) References Cited

U.S. PATENT DOCUMENTS

| | | | |
|---|---|---|---|
| 8,186,940 B2 * | 5/2012 | Landa | F03D 80/00 415/116 |
| 8,492,919 B2 | 7/2013 | Pabst et al. | |
| 8,502,407 B2 | 8/2013 | Sato et al. | |
| 2010/0014974 A1 | 1/2010 | McCorkendale | |
| 2012/0134818 A1 | 5/2012 | Sato et al. | |

* cited by examiner

VENTILATION ARRANGEMENT

BACKGROUND OF THE INVENTION

The present invention relates to a ventilation arrangement for a wind turbine rotor hub, and more specifically to a ventilation arrangement that does not require cutting additional holes in the nosecone.

Many installations inside the hub of a wind turbine rotor produce heat during operation. In particular, heat sources inside the hub may be relays installed in switch cabinets, batteries, chargers for batteries, pitch drive motors, pitch gear boxes, pitch drive controllers, and hydraulic units, as well as the main shaft bearing in some designs. However, reliable operation of several components is only guaranteed within a certain temperature range. For example, electronic circuits or batteries may malfunction at excess temperatures. Due to the several heat sources inside the hub, overheating problems of these components may occur, especially during summer.

Wind turbines may also be upgraded with blade tip extensions to increase the rotor diameter. Increased rotor diameter allows for increased energy production and use in lower wind speeds. However, the larger diameter rotor also causes increased heat generation in the hub, due to greater loads on the pitch system, battery boxes and hub control system.

To solve these overheating problems, ventilation holes are provided in the hub of some wind turbine designs. However, these ventilation holes are relatively small since, otherwise, water may leak into the interior of the hub through the ventilation holes. Of course, this is unfavorable in view of the sensitive electrical and mechanical installations in the hub. Therefore, only a small amount of heat can be exchanged through the small ventilation holes but the cross-sectional area of the ventilation holes cannot be simply enlarged.

BRIEF DESCRIPTION OF THE INVENTION

In view of the above, an improved ventilation arrangement is provided that does not require cutting additional holes in the nosecone, and that directs cool air into an internal space of the rotor hub and a second section adapted for venting hot air from the internal space.

Further aspects, advantages and features of the present invention are apparent from the dependent claims, the description and the accompanying drawings.

According to an aspect of the invention, a ventilation arrangement for a wind turbine includes a manhole cover for covering a manhole of a rotor hub of the wind turbine. The rotor hub is contained within the nose cone and spaced therefrom to form an internal space between an inner surface of the nose cone and an outer surface of the rotor hub. The manhole cover provides a vent opening for venting hot air from an interior space of the rotor hub into the internal space between the inner surface of the nose cone and the outer surface of the rotor hub. Hot air exits out a rear internal space opening. A pipe extends from a forward internal space between the inner surface of the nose cone and the outer surface of the rotor hub, through the manhole cover and into the rotor hub. The pipe establishes fluid communication between the forward internal space and the interior space of the rotor hub. A fan is mounted to the pipe, and the fan is adapted to draw air from the forward internal space. An exhaust is in fluid communication with the pipe, and the exhaust is located in the rotor hub and away from the manhole cover by about 50% to about 90% of a rotor hub axial length.

According to another embodiment of the invention, a ventilation arrangement for a wind turbine includes a manhole cover for covering a manhole of a rotor hub of the wind turbine. The rotor hub is contained within the nose cone and spaced therefrom to form an internal space between an inner surface of the nose cone and an outer surface of the rotor hub. The manhole cover provides a vent opening for venting hot air from an interior space of the rotor hub into the internal space between the inner surface of the nose cone and the outer surface of the rotor hub. Hot air exits out a rear internal space opening. A pipe extends from a forward internal space between the inner surface of the nose cone and the outer surface of the rotor hub, through the manhole cover and into the rotor hub. The pipe establishes fluid communication between the forward internal space and the interior space of the rotor hub. An inlet of the pipe is located in the forward internal space so that cutting holes in the nose cone is avoided. A fan is mounted to the pipe, and the fan is adapted to draw air from the forward internal space. An exhaust is in fluid communication with the pipe, and the exhaust located in the rotor hub and away from a front of the rotor hub by about 50% to about 90% of a rotor hub axial length.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying figures wherein.

DETAILED DESCRIPTION OF THE INVENTION

Figure 1:
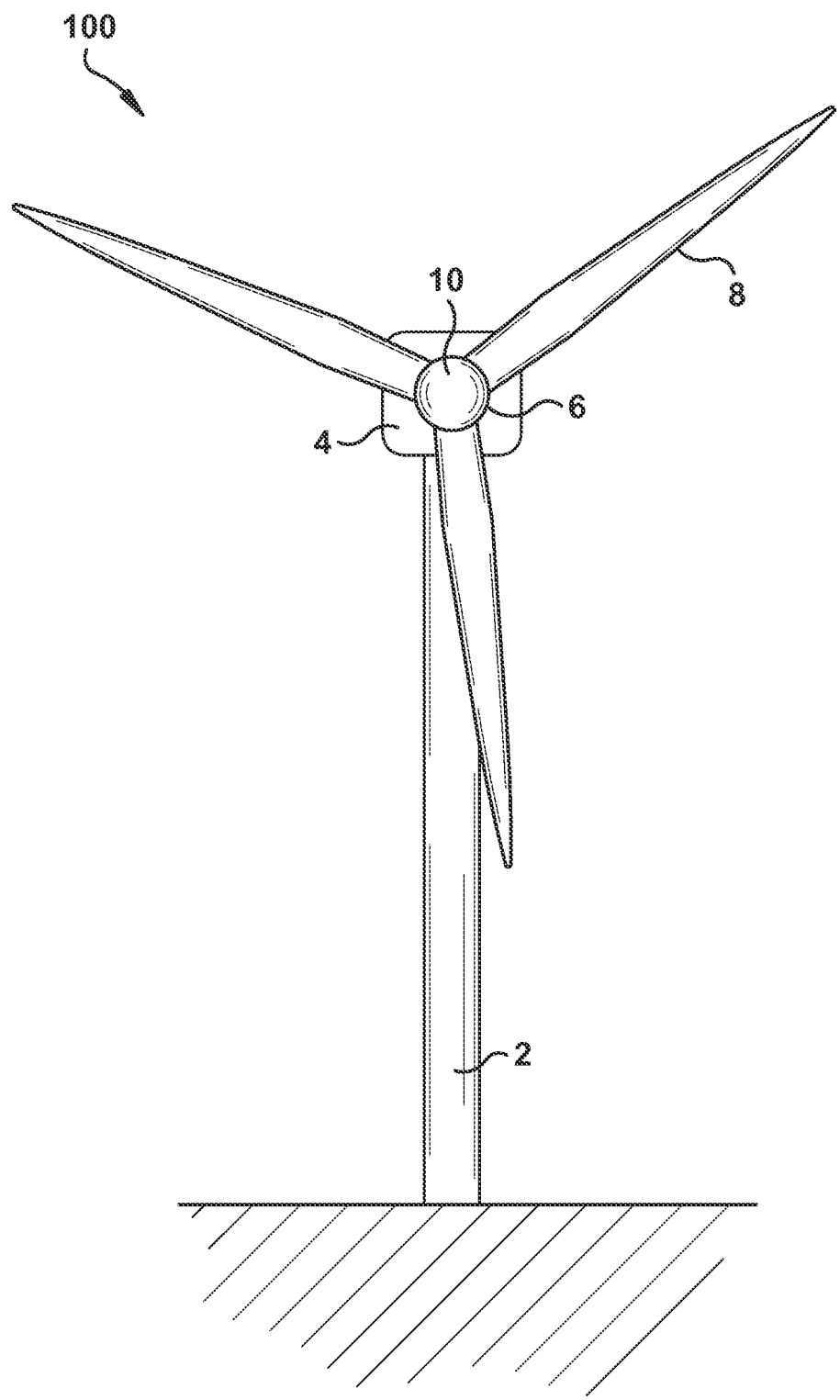
FIG. 1 illustrates a front view of a wind turbine according to an embodiment of the present invention.

Reference will now be made in detail to the various embodiments of the invention, one or more examples of which are illustrated in the figures. Each example is provided by way of explanation of the invention, and is not meant as a limitation of the invention. For example, features illustrated or described as part of one embodiment can be used on or in conjunction with other embodiments to yield yet a further embodiment. It is intended that the present invention includes such modifications and variations. Furthermore, like reference numerals designate like features in the embodiments.

FIG. 1 illustrates a front view of a wind turbine 100 according to an embodiment of the present invention. The wind turbine includes a tower 2 which has a machine nacelle 4 mounted to its top end. A rotor hub 6 is attached to one end of nacelle 4 so that it can it can rotate about an axis approximately parallel to the ground. In some wind turbines the rotor will be tilted up by a few degrees. In the embodiment shown, three rotor blades 8 are attached to rotor hub 6. However, any other suitable number of rotor blades 8 may be used. As will be described in more detail hereinafter, the hub 6 includes an inner shell and an outer nose cone 10 (sometimes referred to as a "spinner").

Figure 2:
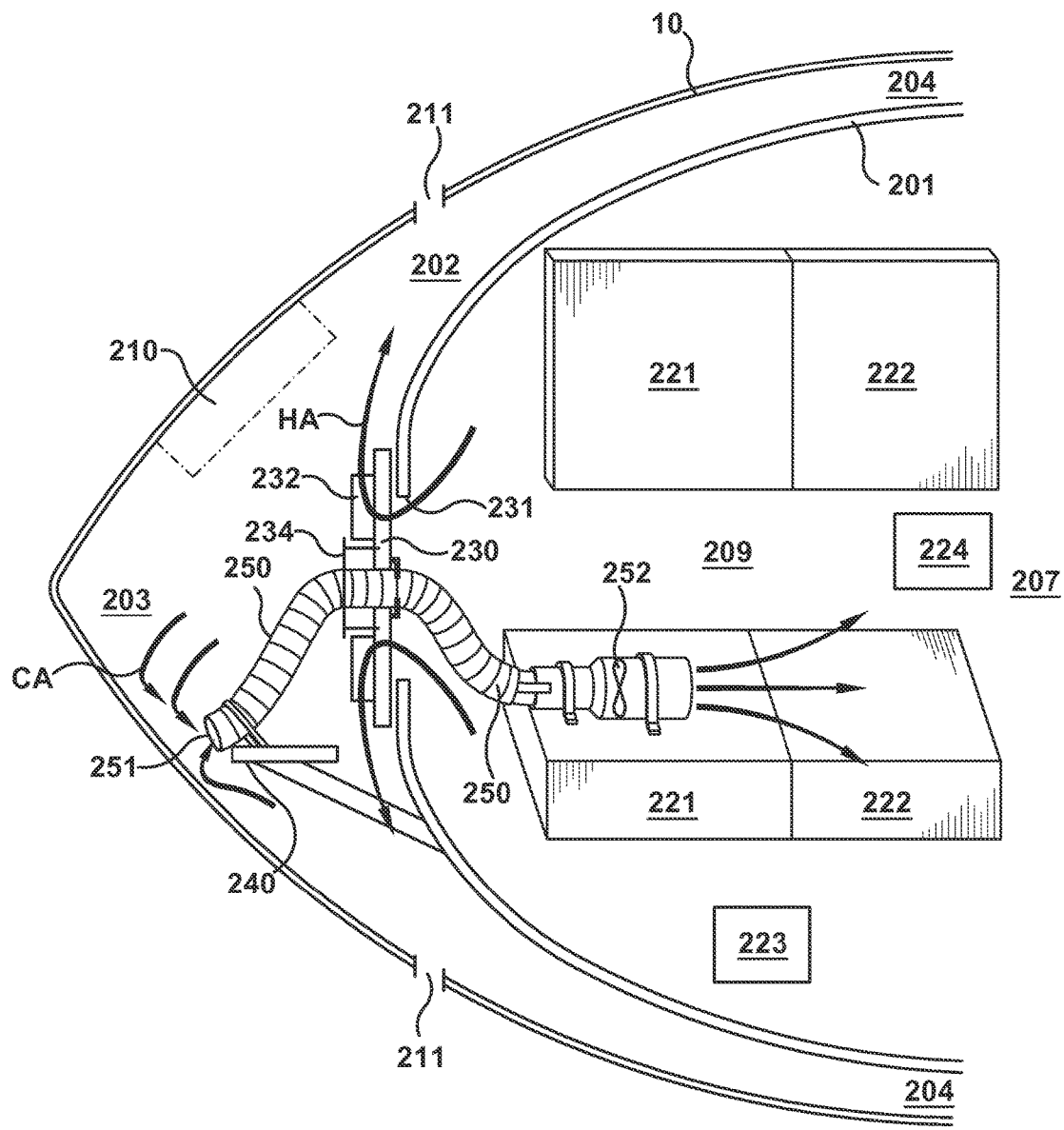
FIG. 2 illustrates a cross-sectional side view of a wind turbine rotor hub according to an embodiment of the present invention.

FIG. 2 illustrates a cross-sectional side view of a wind turbine rotor hub according to an embodiment of the present invention. Therein, a rotor hub 201 is contained within a nose cone 10. Typically, rotor hub 201 is made from cast steel or a similar material providing sufficient structural integrity. Typically, the rotor blades 8 (not shown) are attached to rotor hub 201 by means of flanges (not shown) and bolt connections. Nose cone 10 is typically made of a fiber-reinforced material, e.g. a glass-fiber reinforced plastic. Nose cone 10 provides a suitable aerodynamic design and, in addition, protects the rotor hub 201 from environmental influences like rain, snow, hail or the like. Nose cone 10 is spaced from rotor hub 201, thus providing an internal space 202 between the nose cone and the rotor hub. This internal space 202 may be entered through a hatch door 210 from the outside of nose cone 10. Furthermore, the internal space 202 extends to a rear end 207 of the nose cone 10 and the rotor hub 201. The rear end 207 is oriented toward the machine nacelle (not shown) but spaced from the nacelle wall. Thus, a pocket of air is formed between nacelle 4 and the rotor hub 201/nose cone 10. Typically, nose cone 10 and rotor hub 201 are symmetric with respect to the axis of rotation AR. The internal space 202 further includes a forward internal space 203 and a rear internal space 204. The forward internal space is located between the nose cone 10 and substantially in front of the hub 201.

Inside rotor hub 201, an interior space 209 is provided. A number of installations 221, 222, 223 is disposed within the interior space. For example, for each of the rotor blades 8, axis cabinets 222 and pitch motors 223 may be provided. Furthermore, a battery boxes 221 and a central control cabinet 224 is typically also installed within rotor hub 201. Of course, further installations like battery chargers for the batteries, pitch gear boxes, and hydraulic units may be provided within interior space 209. All these installations produce heat during operation so that the air within interior space 209 is heated.

Figure 3:
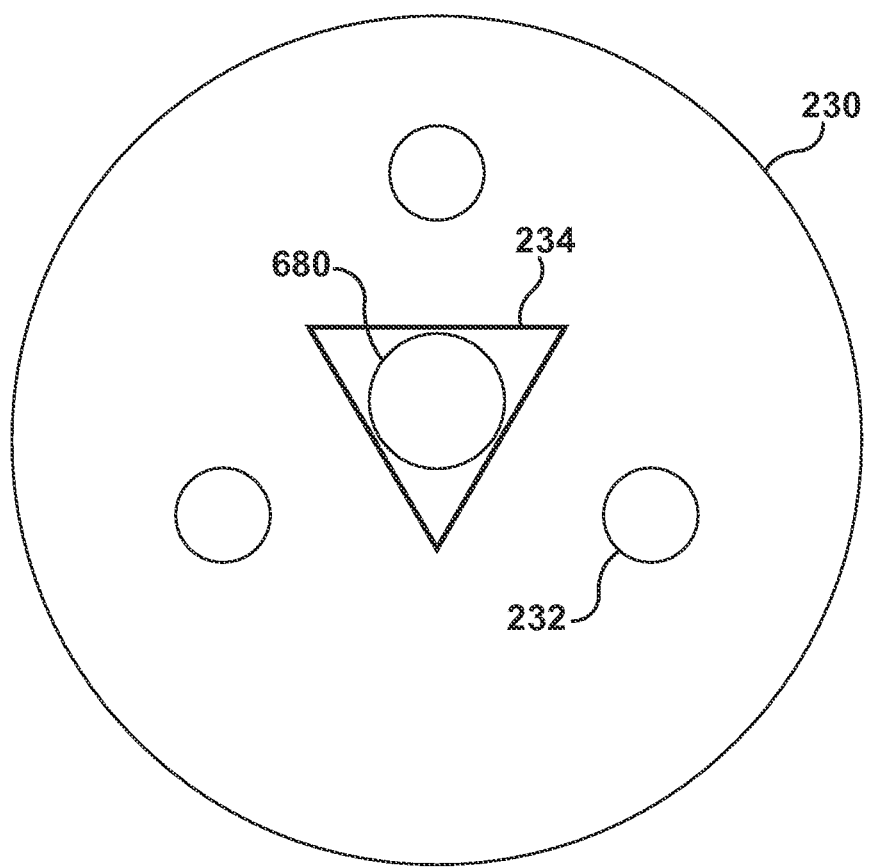
FIG. 3 illustrates a front view of a manhole cover according to an embodiment of the present invention.

Furthermore, a manhole 231 is provided in a front wall of rotor hub 201. Manhole cover 230 covers the manhole 231 and provides a passage between the forward internal space 203 of nose cone 10 and the interior space 209 of rotor hub 201. A ledge step 240 is provided in front of manhole 230 to allow maintenance personnel to access the forward internal space 203. As with a number of installations, not only one but three ledge steps 240 are typically provided and arranged in a rotationally symmetric manner around rotational axis AR. Vent openings 232 are provided within manhole cover 230. The vent openings 232 are designed to allow hot air HA to be vented from interior space 209 into the internal space 202 between the hub and nose cone. The hot air HA may then exit either from a rear internal space 204 opening or from nose cone vents 211. The vents 211 may be configured for admitting air into and exhausting air from the internal space. The vents 211 may also be configured as multiple, axially spaced vents. For example, a first nose cone vent may be formed as a substantially continuous vent at the back or rear end of the hub, and a second nose cone vent may be formed as a substantially continuous vent at the front end of the hub 201. The rear vent can be configured to be larger than the front vent, to accommodate the hot air exhausting from the internal space 202, 204. The vent openings 232 may be provided with shielding members, e.g. rain gutters and/or shutters, to prevent ingress of water from forward internal space 203 into the interior space 209 of rotor hub 201. Furthermore, manhole cover 230 is provided with a tristep 234 mounted to a front surface of manhole cover 230. Typically, tristep 234 is a triangular structure formed from steel bars and spaced from the manhole cover 230 by brackets. The structure of the tristep 234 can also be seen in FIG. 3 showing a front view of the manhole cover 230.

A pipe 250 extends from the forward internal space 203 through the manhole cover 230 and into the interior space 209 of rotor hub 201. The pipe 250 establishes fluid communication (i.e., air passage) between the forward internal space 203 and the rotor hub 201. Cool air CA is drawn into a pipe inlet 251 by fan 252. This cool air CA is pulled through the pipe 250 by fan 252 and is subsequently pushed out of pipe 250 into interior space 209. The fan 252 may be a brushless DC fan capable of speeds in excess of 6,000 rpm, however, any other suitable fan may be used as desired in the specific application. An advantage of this design and configuration is that cool air is forced into the rear of the hub 201 and across installations that produce heat during operation (e.g., battery box 221 and axis cabinet 222). In addition, the inlet 251 of pipe 250 is axially spaced away from manhole vents 232, and this ensures that cooling air drawn into pipe 250 is not mixed with hot air exhausted through vents 232.

Figure 4:
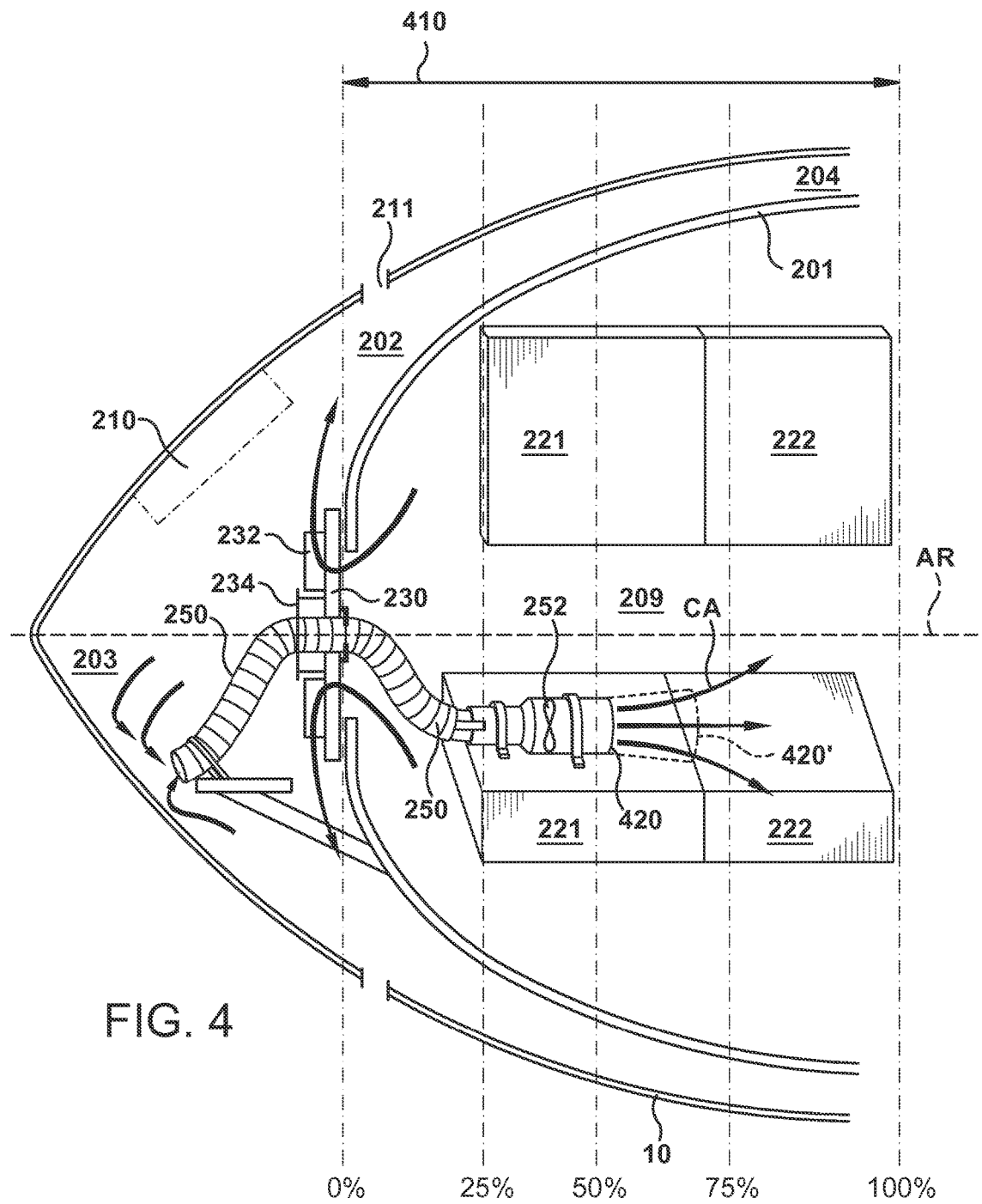
FIG. 4 illustrates a cross-sectional side view of a wind turbine rotor hub according to an embodiment of the present invention.

FIG. 4 illustrates a cross-sectional side view of the wind turbine rotor hub according to an embodiment of the present invention. The rotor hub 201 has an axial length 410 that begins at the front of the hub (0%) and extends axially rearward to the back of hub 201 (100%). The 50% line marks a middle portion or a line that bisects the axial length of the hub. One problem encountered with known hub cooling systems is that the cooling air does not reach the back or rear of the hub 201. Air in interior space 209 tends to axially stratify and resist circulation. In the past, air entering through manhole cover 230 would tend to stay in the front 25% of the hub, indicated by the region between lines 0% and 25%. This left the remaining three quarters or 75% of the interior space 209 uncooled. Unfortunately, most if not all of the hub components needing to be cooled reside in the rear of the hub 201, or at least between about 25% to about 100% of the axial length 410 measured from the front of the hub.

The present invention improves on prior hub cooling attempts by exhausting the cool air CA deep in the hub 201. The pipe exhaust 420 is located away from the manhole cover 230 by about 50% to about 90% of the axial length 410. Alternatively, the exhaust 420' may be located away from the manhole cover 230 by about 66% to about 75% of the axial length 410. Locating the exhaust 420 deep in the hub forces all the air in interior space 209 to circulate, improves cooling of the hub components and enables the hot air HA to be driven out vents 232 and eventually out through nosecone vents 211 and/or rear gap 204. The rear gap 204 is a natural low pressure region and warm or hot air will naturally be drawn to this region once it enters the internal space 202. In testing the present invention, it was found that the hub can be cooled by an additional 20 degrees F. compared to previous hub cooling systems that do not exhaust cooling air at least about 50% of the axial length 410 away from the manhole cover 230, and 40 degrees F. for those hubs with no cooling at all. In addition, the deeper exhaust configuration allows the air exchanges per hour within interior space 209 to be significantly improved. This demonstrates a substantial improvement that was unexpected, and is due to deeper exhaust 420 location within hub 201. Another benefit is that cool air is drawn in from the forward internal space 203, and this avoids the need to cut additional holes in the nosecone 10 and reduces the amount of moisture allowed in the internal space 202 (by the lack of forward located holes in nose cone 10).

Figure 5:
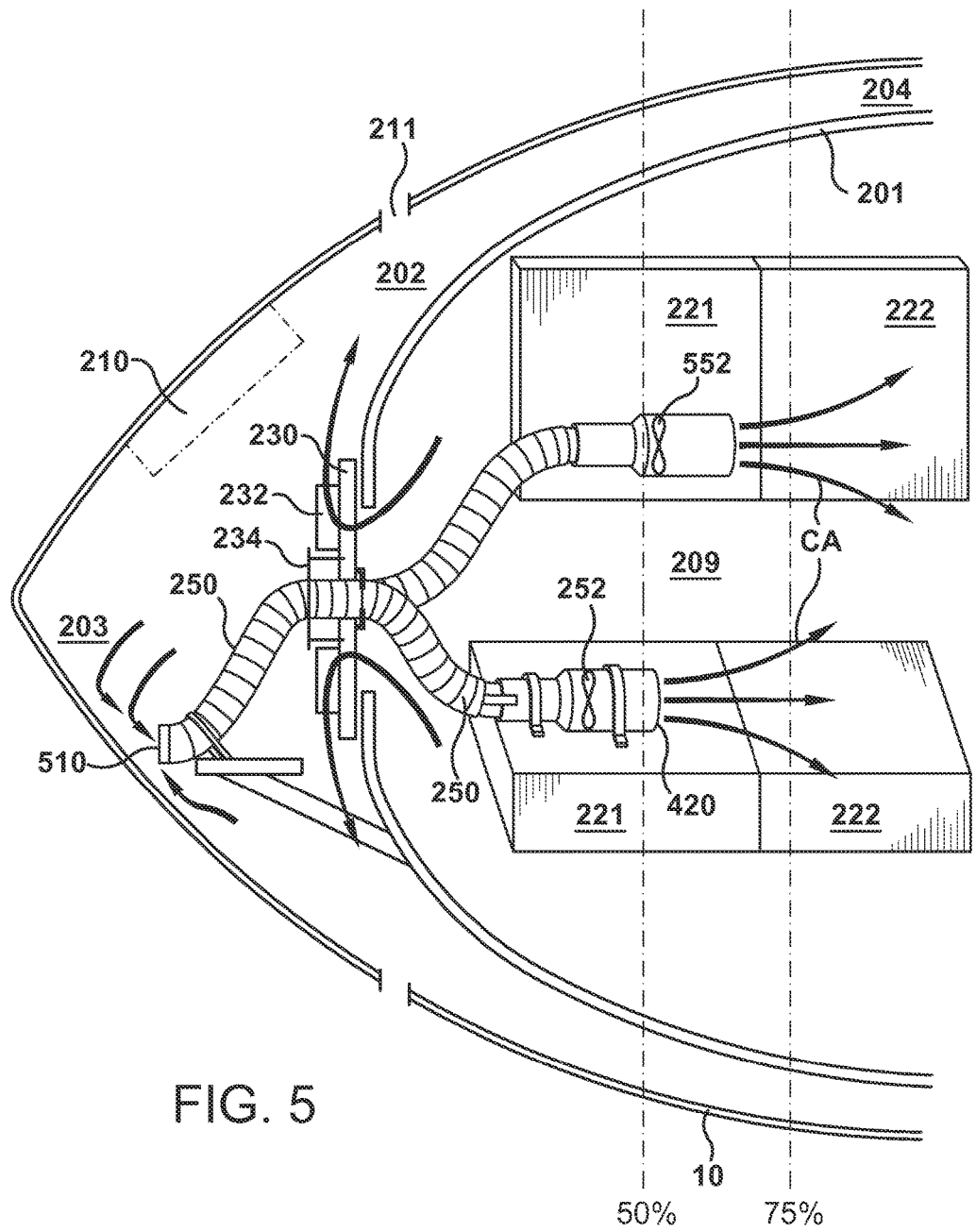
FIG. 5 illustrates a cross-sectional side view of the wind turbine rotor hub according to an embodiment of the present invention.

FIG. 5 illustrates a cross-sectional side view of the wind turbine rotor hub according to an embodiment of the present invention. The pipe 250 may include an air filter 510 connected to the inlet of the pipe 250, or at any other suitable and easily accessible location. The filter 510 can be configured to filter particulate material and/or moisture from the cool air entering the pipe 250 from forward internal space 203. The pipe 250 may also be configured as a branched pipe. The pipe 250 leads from the filtered inlet through manhole cover 230 and then branches into two branches 250 and 250'. The second branch 250' also includes a fan 552 and an exhaust located about 66% of the rotor hub axial length away from the front of hub 201. The fans 252, 552 can be driven with power extracted from battery boxes 221, or any other suitable power source. The fans could also be replaced by a single fan located before each branch, for example, a single fan located in pipe 250 located at or before the manhole cover 230. To facilitate movement of the manhole cover 230 and placement of the pipes 250, 250', each section of the pipe can be comprised of flexible piping. Flexible piping may be corrugated, segmented or bendable pipe. A portion of the pipe 250 may also be supported by the manhole cover 230, typically at the region where the pipe passes through the manhole cover.

Figure 6:
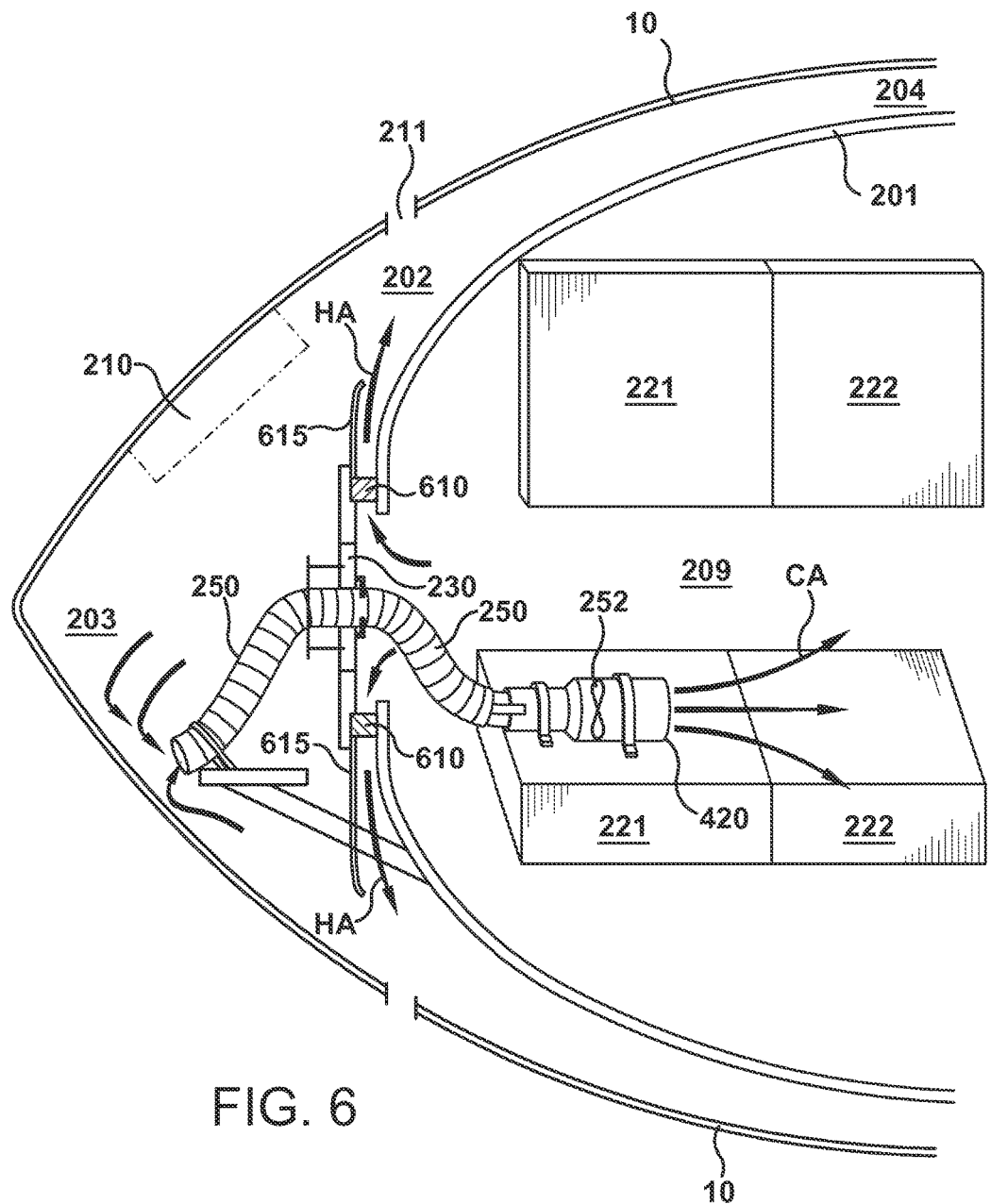
FIG. 6 illustrates a cross-sectional side view of a wind turbine rotor hub according to a different embodiment of the present invention.

FIG. 6 illustrates a cross-sectional side view of a wind turbine rotor hub according to a different embodiment of the present invention. Hot air is vented from the interior space 209 through vent openings provided by spacers 610 between the front wall of rotor hub 201 and manhole cover 230. The spacers 610 are configured to provide a space between the manhole cover 230 and the front wall of the rotor hub 201. Hot air is vented through this space. Furthermore, a shroud 615 is provided at manhole cover 230 to direct the vented hot air HA toward the rear end opening 204 (or rear internal space opening) of the rotor hub.

Figure 7:
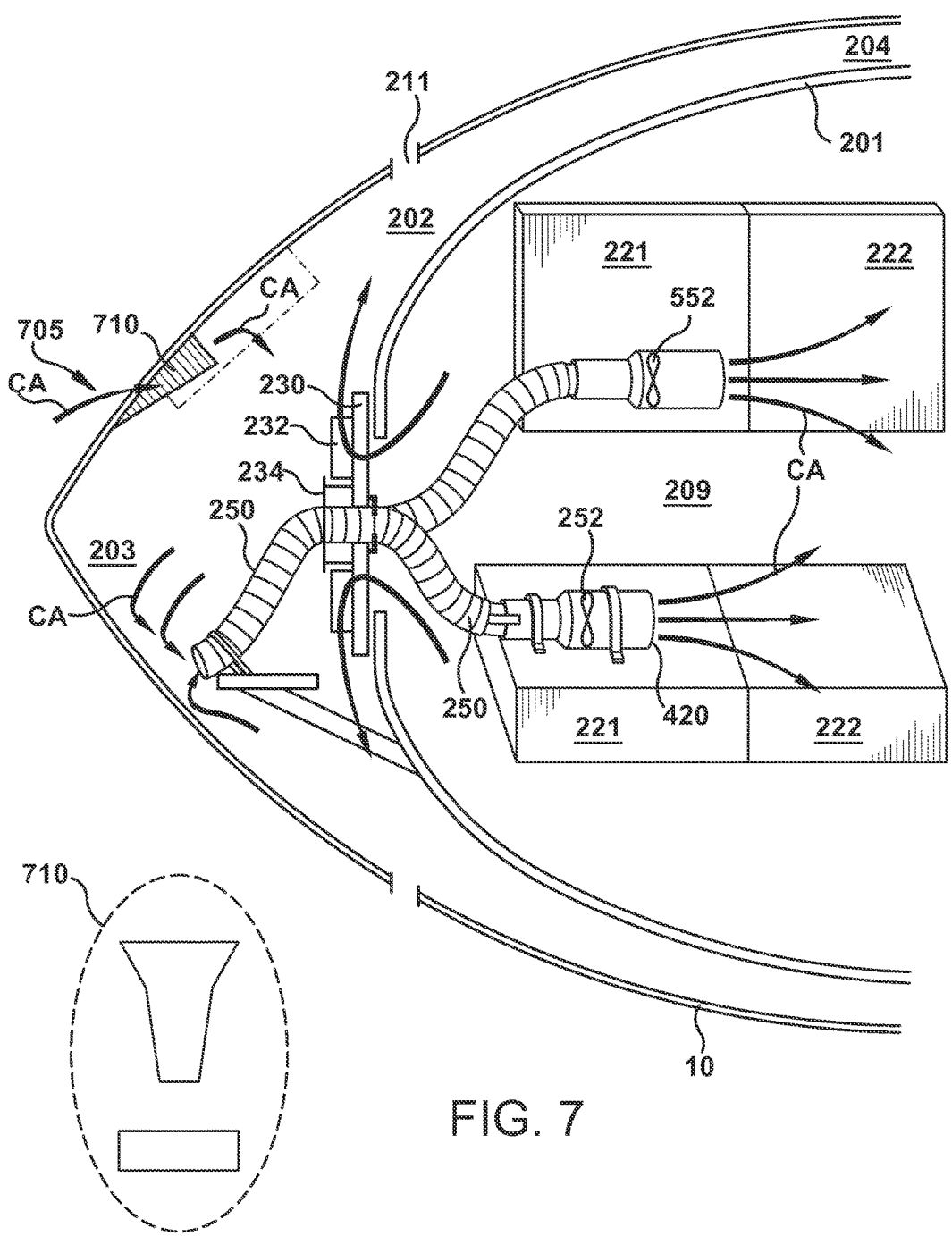
FIG. 7 illustrates a cross-sectional side view of a wind turbine rotor hub according to still another embodiment of the present invention.

FIG. 7 illustrates a cross-sectional side view of a wind turbine rotor hub according to still another embodiment of the present invention. In this embodiment, an air inlet opening 705 is provided at the front end side of nose cone 10. Behind the air inlet 705, a so-called NACA duct 710 is provided. The NACA duct 710 has a specific profile which is shown in the encircled inset on the lower left of FIG. 7. According to its profile, the NACA duct scavenges cold air CA from the boundary layer and conducts it into the internal space 202. However, no dynamic head is lost by applying this principle. The NACA duct profile is known per se in the art and will therefore not be described in more detail hereinafter. One or more NACA ducts could be applied in the configurations to passively or actively ventilate the interior space 202.

The present invention demonstrates substantially improved results that were unexpected, because the hub components are effectively cooled without having to cut a hole in the nose cone. The cooling air is injected deep within the hub and this causes a turbulent air flow path, resulting in effective air mixing and hot air exhaust. In addition, cooling air does not immediately go out the manhole cover vents, as it has in previous hub cooling attempts.

This written description uses examples to disclose the invention, including the best mode, and also to enable any person skilled in the art to make and use the invention. While the invention has been described in terms of various specific embodiments, those skilled in the art will recognize that the invention can be practiced with modification within the spirit and scope of the claims. Especially, mutually non-exclusive features of the embodiments described above may be combined with each other. The patentable scope of the invention is defined by the claims, and may include other examples that occur to those skilled in the art. Such other examples are intended to be within the scope of the claims of they have structural elements that do not differ from the literal language of the claims, or if they include equivalent structural elements with insubstantial differences from the literal languages of the claims.

The invention claimed is:

1. A wind turbine with a ventilation arrangement, comprising:
   a rotor hub;
   a nose cone;
   a manhole cover for covering a manhole of a rotor hub of the wind turbine, wherein the rotor hub is contained within the nose cone and spaced therefrom to form an internal space between an inner surface of the nose cone and an outer surface of the rotor hub, the manhole cover providing a vent opening for venting hot air from an interior space of the rotor hub into the internal space between the inner surface of the nose cone and the outer surface of the rotor hub, the hot air exiting out a rear internal space opening;
   a pipe extending from a forward internal space between the inner surface of the nose cone and the outer surface of the rotor hub, through the manhole cover and into the interior space of the rotor hub, the pipe establishing fluid communication between the forward internal space and the interior space of the rotor hub, wherein an inlet of the pipe is located in the forward internal space so that cutting holes in the nose cone is avoided;
   a fan mounted to the pipe, the fan being adapted to draw air from the forward internal space;
   an exhaust in fluid communication with the pipe, the exhaust located in the interior space of the rotor hub and away from the manhole cover by 50% to 90% of a rotor hub axial length.

2. The ventilation arrangement of claim 1, wherein the exhaust is located away from the manhole cover by 50% to 75% of a rotor hub axial length.

3. The ventilation arrangement of claim 1, wherein the exhaust is located away from the manhole cover by 66% to 75% of a rotor hub axial length.

4. The ventilation arrangement according to claim 1, wherein the pipe is flexible, and the pipe is supported by the manhole cover.

5. The ventilation arrangement according to claim 1, further comprising an air filter connected to the pipe, the air filter configured for filtering the cool air from the forward internal space.

6. The ventilation arrangement according to claim 1, further comprising spacers configured to provide a space between the manhole cover and a wall of the rotor hub so that hot air can be vented from the inside of the rotor hub through said space.

7. The ventilation arrangement according to claim 6, the manhole cover further comprising one or more shrouds, each of the shrouds configured to direct the hot air towards the rear internal space opening.

8. The ventilation arrangement according to claim 1, further comprising a branched pipe located inside the rotor hub, wherein each branch of the pipe leads from the pipe toward a device to be cooled.

9. The ventilation arrangement according to claim 1, further comprising a duct in the nose cone, the duct having a NACA profile to draw cool air from outside the nose cone, and wherein the duct exhausts the cool air into the internal space.

10. The ventilation arrangement according to claim 1, further comprising a plurality of vents located in the nose cone, the plurality of vents configured for admitting air into and exhausting air from the internal space.

\* \* \* \* \*